US008737928B2

United States Patent
Hung et al.

(10) Patent No.: US 8,737,928 B2
(45) Date of Patent: May 27, 2014

(54) METHOD AND ASSOCIATED APPARATUS APPLIED TO RECEIVER OF WIRELESS NETWORK FOR DETERMINING QUANTITY OF ANTENNAS OF TRANSMITTER

(75) Inventors: Shao-Ping Hung, Taipei (TW); Tien-Hsin Ho, Zhubei (TW); Tai-Lai Tung, Zhubei (TW); Ching-Hsiang Chuang, New Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 196 days.

(21) Appl. No.: 13/471,574

(22) Filed: May 15, 2012

(65) Prior Publication Data
US 2013/0171943 A1    Jul. 4, 2013

(30) Foreign Application Priority Data
Jan. 3, 2012 (TW) .............................. 101100237 A

(51) Int. Cl.
*H04B 17/00* (2006.01)
*H04W 24/04* (2009.01)
*H04W 24/00* (2009.01)
*H04W 88/00* (2009.01)

(52) U.S. Cl.
CPC .............. *H04W 24/04* (2013.01); *H04W 24/00* (2013.01); *H04W 88/00* (2013.01)
USPC ........ 455/67.11; 370/320; 370/330; 343/766; 343/797

(58) Field of Classification Search
CPC ..... H04W 24/00; H04W 24/04; H04W 24/08; H04W 88/00; H04W 56/00
USPC .................................. 455/67.11, 562.1, 575.7
See application file for complete search history.

(56) References Cited

U.S. PATENT DOCUMENTS

| | | | |
|---|---|---|---|
| 7,684,527 B2 * | 3/2010 | Yokoyama ..................... 375/347 |
| 7,809,020 B2 * | 10/2010 | Douglas et al. ............... 370/474 |
| 7,912,012 B2 * | 3/2011 | Ma et al. ........................ 370/332 |
| 8,018,975 B2 * | 9/2011 | Ma et al. ........................ 370/509 |
| 8,244,298 B2 * | 8/2012 | Luschi et al. ............... 455/553.1 |
| 8,254,354 B2 * | 8/2012 | Trainin et al. ................. 370/338 |
| 8,441,918 B2 * | 5/2013 | Ma et al. ........................ 370/208 |
| 8,537,771 B2 * | 9/2013 | Ginzburg et al. ............. 370/330 |
| 8,565,168 B2 * | 10/2013 | Papasakellariou et al. ... 370/329 |
| 8,605,658 B2 * | 12/2013 | Fujimoto ....................... 370/328 |

* cited by examiner

*Primary Examiner* — Marceau Milord
(74) *Attorney, Agent, or Firm* — Edell, Shapiro & Finnan, LLC

(57) ABSTRACT

A method applied to a receiver of a wireless network for determining an unknown quantity of antennas of a transmitter according to a received network is provided. The method includes: delaying the network signal according to a sum of a reference period and an estimated shift interval to provide a delayed signal; calculating a correlation between the network signal and the delayed signal to generate a correlation index; comparing the correlation index and a threshold to provide a comparison result; and determining the unknown quantity of transmitting antennas according to the comparison result.

20 Claims, 7 Drawing Sheets

$$MR(t) = \frac{\sum_{k=1}^{N} r(t+k) \cdot r^*(t+k+N+Le)}{\sum_{k=1}^{N} |r(t+k+N+L)|^2} \quad \text{---eq3}$$

$$MR(t) = \frac{\sum_{k=1}^{N} r(t+k) \cdot r^*(t+k+N+Le)}{\sum_{k=1}^{N} |r(t+k)|^2} \quad \text{---eq4}$$

$$MR(t) = \frac{\sum_{k=1}^{N} r(t+k) \cdot r^*(t+k+N+Le)}{\sum_{k=1}^{N} |r(t+k+L)|^2} \quad \text{---eq5}$$

FIG. 6

METHOD AND ASSOCIATED APPARATUS APPLIED TO RECEIVER OF WIRELESS NETWORK FOR DETERMINING QUANTITY OF ANTENNAS OF TRANSMITTER

This application claims the benefit of Taiwan application Serial No. 101100237, filed Jan. 3, 2012, the subject matter of which is incorporated herein by reference.

BACKGROUND OF THE INVENTION

1. Field of the Invention

The invention relates to a method and associated apparatus applied to a receiver of a wireless network, and more particularly, to a method and associated apparatus capable of determining an unknown quantity of antennas of a transmitter according to a network signal received at a receiver.

2. Description of the Related Art

A wireless network, which performs exchange, interconnection, communication and/or broadcasting of packet, data, message, command, audio and video streams by network signals via wireless transmission, is one of the most important network techniques in modern communication technology. Among the various wireless network techniques, multi-input multi-out (MIMO) is a focus of research and development. Reasons contributing to such importance of the MIMO technique are that, without occupying additional bandwidth, the MIMO technique is capable of increasing a network capacity and data transmission rate, reducing bit error rate, strengthening interference resistance, improving directivity through beamforming and/or reinforcing resistance against channel attenuation. For example, the wireless local area network based on the IEEE 802.11n specification has incorporated the MIMO technique. In a MIMO wireless network, one transmitter may be provided with multiple antennas, each sending corresponding single-antenna signals. Network signals received at a receiver are synthesized from the single-antenna signals. Similarly, one receiver may also be provided with one or multiple antennas to receive the network signals transmitted from the transmitter.

Since the network signals transmitted from the transmitter may be transmitted by one or multiple antennas, the receiver is unaware of the quantity of antennas at the transmitter when first receiving the network signals. The sooner the receiver determines the quantity of transmitting antennas at the transmitter, the more quickly the information carried in the network signals can be parsed. Therefore, it is critical that the receiver be able to correctly determine the unknown quantity of transmitting antennas according to the received network signals.

SUMMARY OF THE INVENTION

To synchronize timings and/or frequencies of a receiver and a transmitter, the transmitter appends a reference message for synchronization in a wireless network signal at a beginning of the network signal. The reference message is predetermined according to a wireless network specification. Therefore, for the receiver, the duration of the reference signal is known. For example, in an orthogonal frequency division multiplexing (ODFM) wireless network signal, a short preamble sequence of a packet preamble includes a plurality of short preambles with repeated content. Each of the short preambles may be regarded as a reference message having a duration as a reference period.

When a transmitter transmits wireless network signals via one or multiple antennas, each antenna transmits respective single-antenna wireless signals. Network signals received by the receiver are synthesized from the single-antenna wireless signals. Each of the single-antenna wireless signals of the antennas contains individual reference messages. To prevent unexpected beamforming, the transmitter introduces a cyclic shift delay. The length of the cyclic shift delay is predetermined according to a wireless network specification, and hence the cyclic shift delay is also known for the receiver. The present invention is directed to determining a quantity of transmitting antennas according to the reference period for the reference message and the cyclic shift delay.

According to an object the present invention, a method applied to a receiver for determining an unknown quantity of antennas of a transmitter is provided. The receiver receives a network signal synthesized from a plurality of single-antenna signals corresponding to the unknown quantity of antennas. Each of the single-antenna signals is transmitted from a corresponding antenna, and comprises a plurality of reference messages each lasting for a reference period. The method comprises steps of: delaying the network signal according to a sum of a reference period and an estimated shift interval to provide a delayed signal; calculating a correlation between the network signal and the delayed signal to generate a correlation index; comparing the correlation index and a threshold to provide a comparison result; and determining the unknown quantity according to the comparison result.

Between the different antennas, a cyclic shift delay between the reference messages of the different single-antenna signals is an integral multiple of a basic delay. The method further comprises: setting the estimated shift interval according to the basic delay and an estimated number. In the step of determining the quantity of antennas, when the comparison result indicates that the correlation index is greater than the threshold, it is determined that the unknown quantity is not less than the estimated number. Conversely, when the comparison result indicates that the correlation index is smaller than the threshold, it is determined that the unknown quantity is smaller than the estimated number. Equivalently, the determining step determines the unknown quantity according to a ratio of the estimated shift delay and the basis delay.

In an embodiment, the method further comprises: updating the estimated number, and iterating the setting, delaying, calculating the correlation, comparing and determining steps. In an embodiment, the threshold is also updated when updating the estimated number. For example, when the estimated number increases, the threshold may decrease, and vice versa.

In an embodiment, the step of calculating the correlation further comprises: providing a summation result according to a product of the delayed signal and the network signal accumulated in an accumulation period, and generating the correlation index according to a ratio of the accumulation result and a normalized factor. The length of the accumulation period may equal the length of the reference period.

It is another object of the present invention to provide an apparatus applied to a receiver of a wireless network for determining an unknown quantity of transmitting antennas. The apparatus comprises a delay module, a delay correlation calculation module, a comparing module, a determining module and a setting module. The setting module sets an estimated shift interval according to a basic delay and an estimated number. The delay module delays a network signal according to a reference period and the estimated shift interval to provide a delayed signal. The delay correlation calculation module calculates a correlation between the delayed signal and the network signal to generate a correlation index. The comparing module compares the correlation index and a threshold to provide a comparison result. The determining module determines the unknown quantity according to the comparison result.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 6 shows equations for calculating a delay correlation according to different embodiments of the present invention.

DETAILED DESCRIPTION OF THE INVENTION

Figure 1:
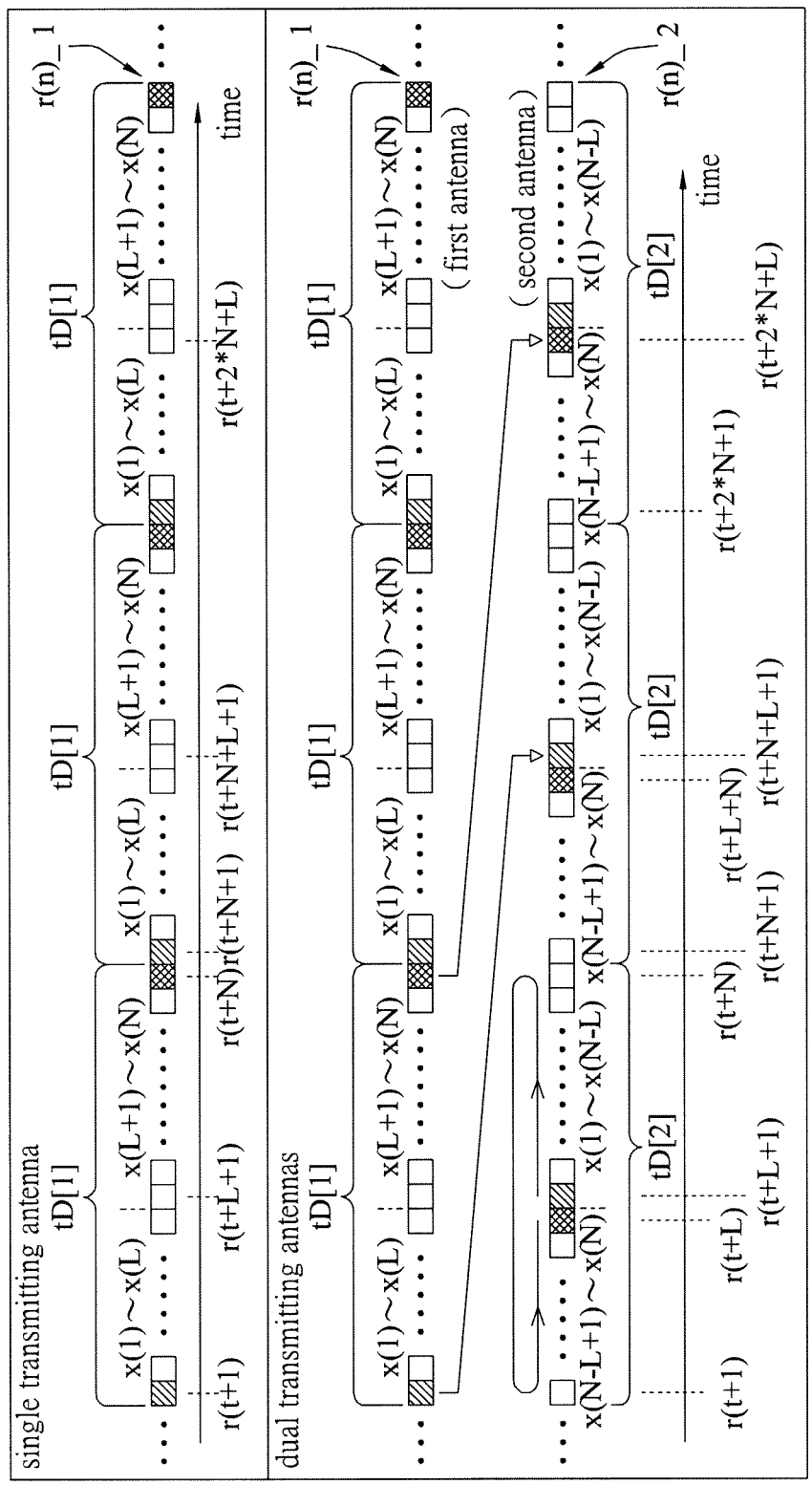
FIG. 1 is a schematic diagram of a network signal synthesized from single-antenna signals transmitted by different numbers of transmitting antennas.

FIG. 1 shows a schematic diagram of single-antenna signals of different antennas. When a transmitter transmits wireless network signals via a single antenna, the single antenna transmits a single-antenna wireless signal $r(n)\_1$, and a network signal $r(n)$ received by a receiver is formed by the single-antenna wireless signal $r(n)\_1$. The single-antenna wireless signal $r(n)\_1$ includes a plurality of reference messages $tD[1]$. For example, each of the reference messages can be a preamble (also referred to as a short training symbol). Referring to FIG. 1, each of the reference messages $tD[1]$ includes N samples $x(1)$ to $x(N)$. When received at the receiver, the samples $x(1)$ to $x(N)$ respectively correspond to network signal values $r(t+1)$ to $r(t+N)$ at time points $(t+1)$ to $(t+N)$. A duration of the reference message $tD[1]$ (i.e., a reference period) is represented by the number N.

Assuming the transmitter includes a first antenna and a second antenna, the first and second antennas respectively transmit wireless signals $r(n)\_1$ and $r(n)\_2$, and a network signal received by the receiver is synthesized from the two single-antenna wireless signals $r(n)\_1$ and $r(n)\_2$, e.g., $r(n)=h1*r(n)\_1+h2*r(n)\_2$, where h1 and h2 are synthesis weightings associated with distances, directions, noise and channel attenuation between the two antennas and the receiver. The single-antenna wireless signals $r(n)\_1$ and $r(n)\_2$ respectively include a plurality of duplicated reference messages $tD[1]$ and $tD[2]$. As mentioned above, each of the reference messages $tD[1]$ includes N samples $x(1)$ to $x(N)$; similarly, each reference messages $tD[2]$ similarly includes N samples. Compared to the reference message $tD[1]$, the transmitter introduces additional cyclic shift delay into the reference message $tD[2]$ of the single-antenna wireless signal $r(n)\_2$, such that first L number of samples are respectively $x(N-L+1)$ to $x(N)$, and following $(N-L)$ number of samples are respectively $x(1)$ to $x(N-L)$. In other words, the samples of the reference message $tD[2]$ are obtained from cyclically shifting the samples $x(1)$ to $x(N)$ by the number L, where the number L corresponds to a temporal length of the cyclic shift delay.

Following the above example, in the dual transmitting antennas transmitter, since the network signal $r(n)$ is synthesized from the single-antenna wireless signals $r(n)\_1$ and $r(n)\_2$, the L number of network signal values $r(t+1)$ to $r(t+L)$ at time points $(t+1)$ to $(t+L)$ are respectively synthesized from the samples $x(1)$ to $x(L)$ and samples $x(N-L+1)$ to $x(N)$. That is, the network signal value $r(t+n)=h1*x(n)+h2*x(N-L+n)$, where n=1 to L. At subsequent time points $(t+L+1)$ to $(t+N)$, the following $(N-L)$ number of network signal values $r(t+L+1)$ to $r(t+N)$ are respectively synthesized from the samples $x(1)$ to $x(N-L)$. That is, the network signal value $r(t+n)=h1*x(n)+h2*x(n-L)$, wherein n=(L+1) to N.

At the onset of the receiver receiving the network signal $r(n)$ (e.g., when only the reference message is received), the receiver is unaware of the quantity of antennas of the transmitter transmitting the single-antenna signals forming the network signal $r(n)$. Taking FIG. 1 for example, the network signal $r(n)$ includes two single-antenna signals $r(n)\_1$ and $r(n)\_2$, the reference signal cyclically repeats by the number N, and between the different reference messages $tD[1]$ and $tD[2]$ is the number L as cyclic shift delay. Therefore, it is concluded that both of the network signal values $r(t+1)$ and $r(t+N+L+1)$ comprise the sample $x(1)$. Similarly, both the network signal values $r(t+k)$ and $r(t+N+L+k)$ comprise the sample $x(k)$. Hence, between the network signal values $r(t+k)$ and $r(t+N+L+k)$ is a noticeable correlation. In contrast, in the event that the network signal $r(n)$ includes only the single-antenna signal $r(n)\_1$ transmitted from a single antenna, the network signal value $r(t+k)$ is dominated by the sample $x(k)$, and the network signal value $r(t+N+L+k)$ is dominated by the sample $x(k+L)$, such that the correlation between the network signal values $r(t+k)$ and the $r(t+N+L+k)$ is relatively lower.

Therefore, the embodiment of the present invention determines the quantity of antennas of the transmitter according to the correlation between the network signal values $r(t+k)$ and $r(t+N+L+k)$ in the receiver.

Figure 2:
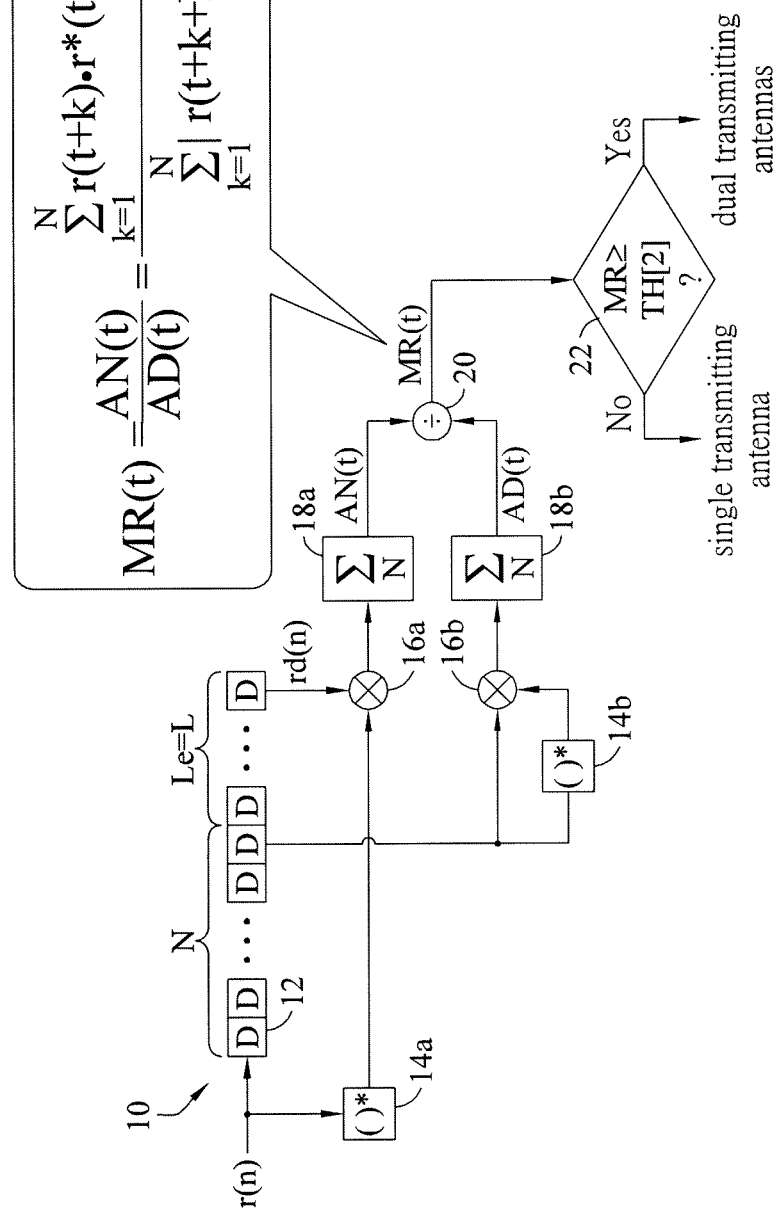
FIG. 2 is a schematic diagram of a determination operation for determining the quantity of antennas of a transmitter according to an embodiment of the present invention.

FIG. 2 shows a schematic diagram of a determination operation 10 for determining the quantity of antennas of a transmitter according to an embodiment of the present invention. The determination operation 10 determines whether the quantity of antennas of the transmitter is greater than 1 according to the network signal $r(n)$ received by the receiver. For example, the network signal $r(n)$ can be an intermediate-frequency (IF) or baseband signal obtained by down-converting an RF signal, and may be a complex variable signal. That is, each of the samples of the network signal $r(n)$ may include a real part and an imaginary part, which respectively correspond to an in-phase part and a quadrature-phase part of the signal.

The determination operation 10 includes (N+Le) number of delay operations 12, conjugate operations 14a and 14b, multiplications 16a and 16b, summations 18a and 18b, a divider 20 and a comparison 22. In continuation of the embodiment in FIG. 1, the number N corresponds to the reference period of the reference messages, and the number Le corresponds to an estimated shift interval. The (N+Le) number of delay operations 12 delay the network signal $r(n)$ to a delayed signal $rd(n)$. More specifically, the network signal $r(n)$ is delayed according to a sum of the reference period and the estimated shift interval to provide the delayed signal $rd(n)$. To determine whether the network signal $r(n)$ corresponds to dual antennas of a transmitter, the number Le corresponding to the estimated shift interval may be set to the number L according to the cyclic shift delay between two single-antenna signals (FIG. 1).

Through the conjugate operations 14a and 14b, the multiplications 16a and 16b, the summations 18a and 18b and the divider 20, a delay correlation calculation is performed to obtain a correlation index MR(t) according to the correlation between the network signal r(n) and the delayed signal rd(n), as shown in an equation eq1. In a summation period, through the conjugate operation 14a, the multiplication 16a and the summation 18a, a product of the conjugates of the delayed signal rd(n) and the network signal r(n) are accumulated to provide a summation result AN(t). For example, the length of the summation period may equal the length of the reference period, where N number of products are accumulated in the summation period. Similarly, through the conjugate operation 14b, the multiplication 16b and the summation 18b, N number of products are also accumulated according to the network signal r(n) and its conjugate in a similar summation period to provide a normalized factor AD(t). The divider 20 then generates the correlation index MR(t) according to a ratio of the summation result AN(t) and the normalized factor AD(t).

It can be seen from the discussion of FIG. 1 that, the network signal values r(t+k) and r(t+N+L+k) have a high correlation when the network signal r(n) contains two single-antenna signals. Therefore, with respect to the correlation index MR(t) generated from accumulating the product of the conjugates of the network signal values r(t+k) and r(t+N+L+k), the value of the correlation index MR(t) is also correspondingly higher. In contrast, when the correlation index MR(t) is a low value, it means that the network signal r(n) contains only one single-antenna signal transmitted by one transmitting antenna. The comparison 22 in FIG. 2 compares whether the correlation index MT(t) is greater than a threshold TH[2]. When the correlation index MT(t) is greater than the threshold TH[2], it means that the network signal values r(t+k) and r(t+N+L+k) have a high correlation, and so it is determined that the network signal r(n) is synthesized from signals transmitted from dual transmitting antennas. When the correlation index MT(t) is not greater than the threshold TH[2], it is determined that the network signal r(n) is transmitted from only one single antenna.

For example, the comparison 22 is performed in a comparison window at the beginning of the network signal r(n) to compare whether the correlation index MR(t) is greater than the threshold TH[2]. When the correlation index MR(t) exceeds the threshold TH[2] in the comparison window, it is determined that the transmitter has two antennas, or else it is determined that the transmitter has one single antenna. The length of the comparison window can be several times of the length of the reference period. In general, the receiver of the wireless network determines whether a valid signal (non-noise) is present in the wireless channel according to wireless reception efficiency. The receiver proceeds with the reception once a valid signal is present, and determines in an observation window whether the valid signal is a network signal compliant to a wireless network specification. The comparison window for the comparison 22 may be set near the observation window (e.g., partially overlapping with each other), or in the observation window.

Figure 3:
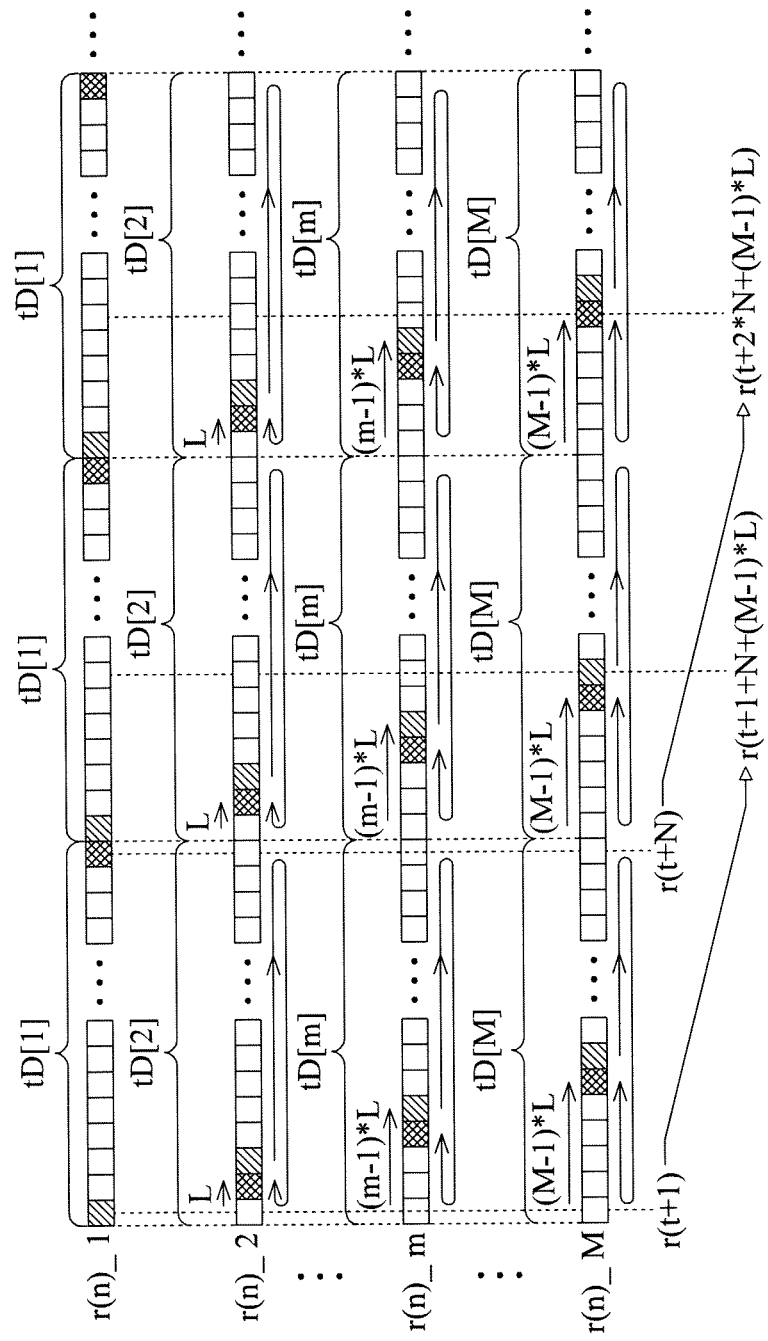
FIG. 3 is a schematic diagram of multiple single-antenna signals transmitted by multiple transmitting antennas.

The embodiment of the present invention in FIG. 2 is capable of distinguishing one single transmitting antenna from dual transmitting antennas included in the transmitter. Further, the principle of the present invention may be extended to determine additional numbers of antennas included in a transmitter with possibility of a larger quantity of antennas. FIG. 3 shows a schematic diagram of multiple single-antenna signals transmitted by multiple transmitting antennas. Assume here that the transmitter has M number of transmitting antennas, wherein an (m)th transmitting antenna transmits a single-antenna signal r(n)_m. A network signal r(n) received by a receiver is synthesized from single-antenna signals r(n)_1 to r(n)_M. Each single-antenna signal r(n)_m comprises a plurality of reference messages tD[m], and a reference period of each reference message tD[m] is represented by the number N. Taking the reference message tD[1] in the single-antenna signal r(n)_1 for example, in the single-antenna signal r(n)_1, between the reference messages tD[m] and tD[1] is the number [(m−1)*L] as the cyclic shift delay (where m=1 to M), as shown in FIG. 3. That is to say, if L may represent a basic delay, and the cyclic shift delay between the reference messages tD[1] and tD[m] is an integral multiple of the basic delay, then the cyclic shift delay between the reference messages tD[1] and tD[m] is the number [(m−1)*L].

Due to the cyclical property of the reference messages and the cyclic shift delay between the reference messages, both the network signal values r(t+k) and r(t+k+N+(m−1)*L) comprise the sample x(k) (where k=1 to N, m=2 to M) so that the network signal values r(t+k) and r(t+k+N+(m−1)*L) have a higher correlation. In contrast, for a number M0, when the correlation between the network signal values r(t+k) and r(t+k+N+(m−1)*L) is low, it means that the number M of the transmitting antennas is smaller than the number M0. Therefore, the present invention is capable of further determining whether the network signal r(n) is transmitted by multiple transmitting antennas.

Figure 4:
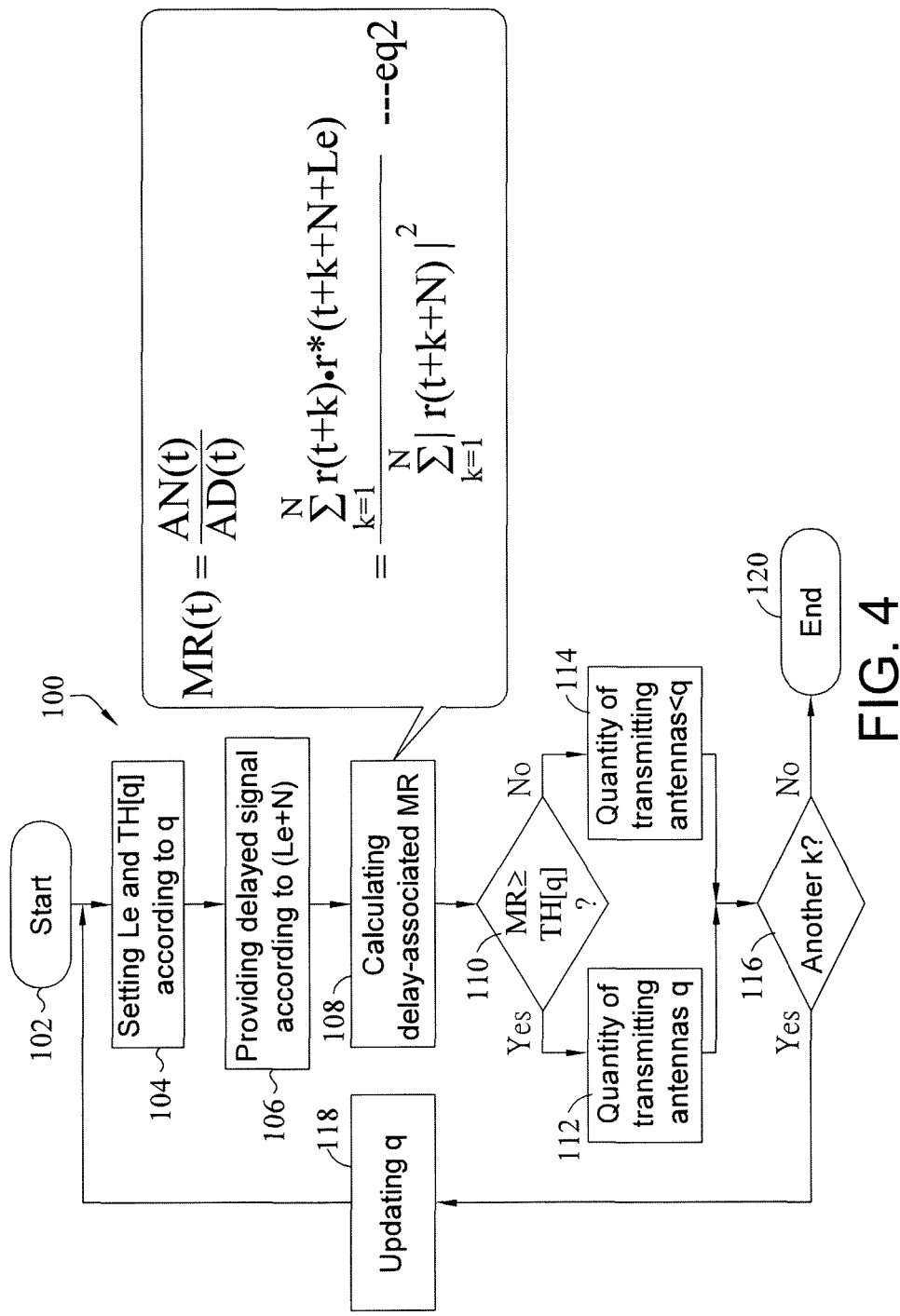
FIG. 4 is a flowchart of a process according to an embodiment of the present invention.

FIG. 4 shows a flowchart of a process 100 according to an embodiment of the present invention. The process 100 is applied to a receiver of a wireless network to determine an unknown quantity M of antennas of a transmitter, which includes following steps.

The flow 100 begins in Step S102.

In Step 104, a setting operation is performed. A number Le is set according to an estimated number q and a basic delay number L, where the number Le represents an estimated shift interval. For example, the number Le equals a number [(q−1)*L]. Further, a threshold TH[q] corresponding to the estimated number q may also be set.

In Step 106, a delay operation is performed. According to a sum (N+Le) of the number N of the reference period and the number Le of the estimated shift interval, a network signal r(n) is delayed to provide a delayed signal rd(n).

In Step 108, a delay correlation calculation is performed. A correlation between the delayed signal rd(n) and the network signal r(n) is calculated to generate a correlation index MR(t). An equation eq2 in FIG. 4 shows an embodiment of the correlation index MR(t). In this embodiment, during a period k=1 to N, a summation result AN(t) is provided by accumulating a product of network signal values r(t+k) and r*(t+k+N+Le), and a normalized factor AD(t) is at the same time provided according to a product of the network signal values r(t+k) and r*(t+k+N+Le). Next, according to a ratio AD(t)/AD(t) of the summation result AN(t) and the normalized factor AD(t), the correlation index MR(t) is generated.

In Step 110, a comparison is performed. It is determined whether the correlation index MR(t) is greater than the threshold TH[q]. When the correlation index MR(t) is greater than the threshold TH[q], Step 112 is iterated, or else the process 100 proceeds to Step 114. As previously described with reference to FIG. 2, Step 110 may be comparing whether the correlation index MR(t) exceeds the threshold TH[q] in a comparison window. Further, Steps 112 and 114 may be regarded as determination operations for determining the unknown quantity of transmitting antennas according to a comparison result in Step 110.

In Step 112, when the correlation index MR(t) is greater than the threshold TH[q], it is determined that the number M of the transmitting antennas is no smaller than the estimated number q. Further, the correlation index MR(t) in a higher value indicates that the network signal values r(t+k) and r*(t+k+N+Le) have a higher correlation, and so it infers that the number M of the transmitting antennas is at least the number q or more than the number q if the number Le is set according to the number [(q−1)*L].

In Step 114, in contrast to Step 112, when the correlation index MR(t) is smaller than the threshold TH[q], it is determined that the number M of the transmitting antennas is less than the estimated number q.

In Step 116, Step 118 is performed when a relationship between the number M of the transmitting antennas and another estimated number q is to be further examined, or else Step 120 is performed.

In Step 118, an update is performed. The value of the estimated number q is updated, and Steps 104, 106, 108, 110, 112 or 114 and 116 are iterated according to the updated estimated number q. In an embodiment, the value of the estimated number q may be gradually increased from a smaller value. For example, the estimated number q may be initially set to 2, and it is determined by Steps 104, 106, 108, 110, and 112 or 114 whether the number of the transmitting antennas is greater than 2. When it is determined that the number of the transmitting antennas is greater than 2 (in Step 112), the estimated number q may be updated to 3 (in Step 118), and Steps 104, 106, 108, 110 and 112 or 114 are iterated to determine whether the number M of transmitting antennas is greater than 3. When it is determined that the number M is greater than 3 (in Step 112), the estimated number q may be updated to 4 (in Step 118) to continue in determining whether the number M of the transmitting antennas is greater than 4. When it is determined that the number M is smaller than 4 (in Step 114), it is determined that the number M of the transmitting antennas equals 3. When iterating Step 104, the thresholds TH[q] corresponding to different estimated numbers may be the same or different. For example, when updating the estimated number q from a smaller value to a larger value, the threshold TH[q] may be updated from a larger value to a smaller value.

In Step 120, the process 100 ends.

In equivalence, when performing Steps 112 and 114, the value of the number M of the transmitting antennas is determined according to a ratio of the estimated shift interval (the number Le) and the basic delay (the number L). When the correlation index MR(t) calculated based on the number Le indicates a high correlation, the number M of the transmitting antennas is no less than the number (1+Le/L).

Figure 5:
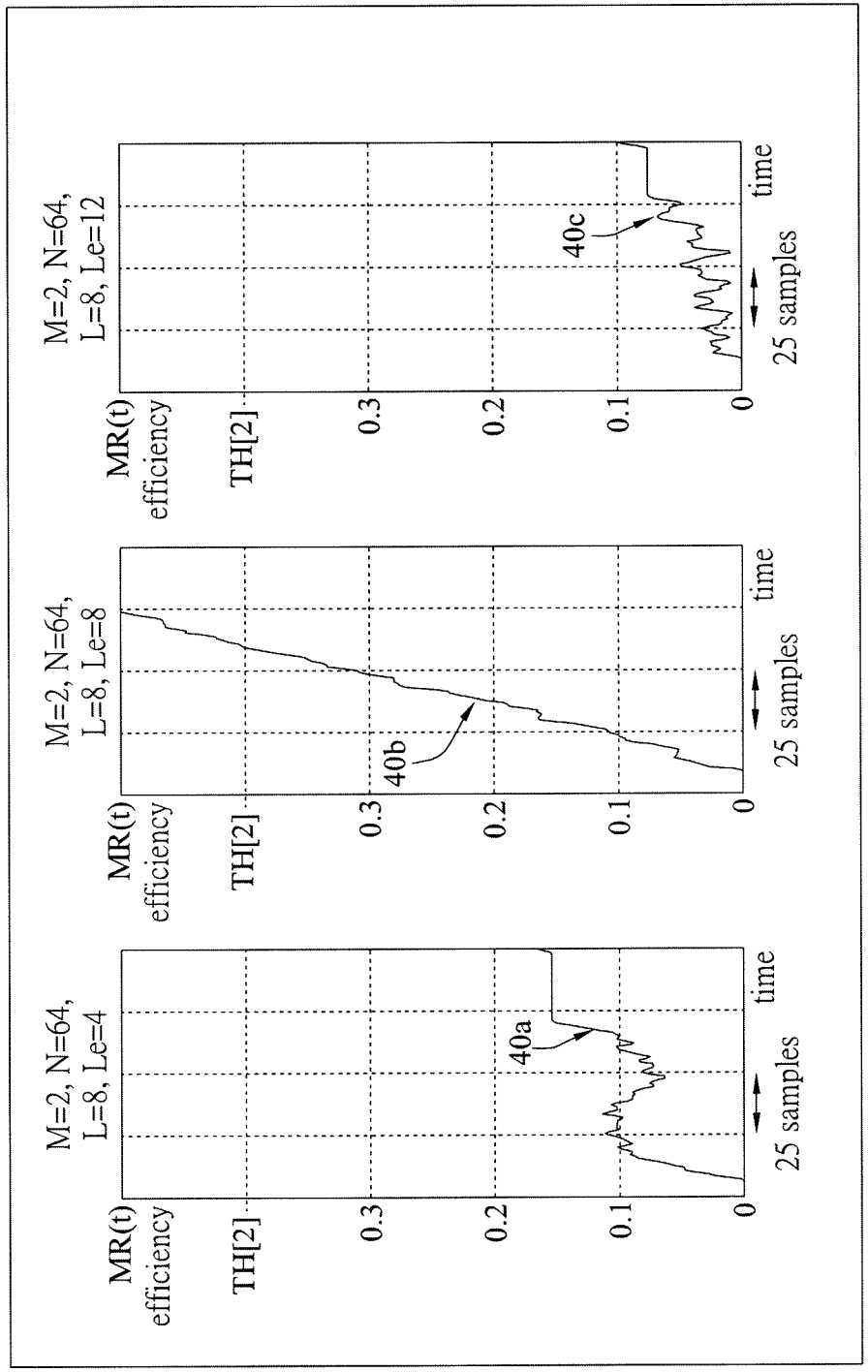
FIG. 5 depicts correlation indices obtained based on different estimated shift intervals.

FIG. 5 shows a schematic diagram of determining a quantity of transmitting antennas of a transmitter according to an embodiment of the present invention. In this embodiment, assuming the number M of the transmitting antennas equals 2 (i.e., dual transmitting antennas), the number N of the reference cycle is 64 (i.e., 3200 ns) and the number L of the basic delay is 8 (i.e., 400 ns), the cyclic shift delay between the two transmitting antennas is then the number 1*L. When the number Le of the estimated shift interval is set to 4 (referring to Step 104), the correlation index MR(t) (in Step 108) in the comparison window is presented as a curve 40a. Similarly, when the number Le of the estimated shift interval is respectively set to 8 and 12, the correlation index MR(t) is respectively presented as a curve 40b and a curve 40c. By comparing the curves 40a, 40b and 40c, it is concluded for the curves 40a and 40c that, since the number Le of the estimated shift interval is not equal to the number L of the basic delay, the correlation obtained from accumulating the product of the network signal values r(t+k) and r*(t+k+N+Le) is lower to be less than the threshold TH[2] (0.4 in this example). In contrast, for the curve 40b, the number Le of the estimated shift interval is exactly equal to the number L of the basic delay, and so the correlation obtained from accumulating the product of the network signal values r(t+k) and r*(t+k+N+Le) exceeds the threshold TH[2]. Therefore, the correlation index MR(t) provides a sufficient distinguishing capability with respect to the number of transmitting antennas and is hence adequate in serving as a reference basis for determining the number of transmitting antennas.

In continuation of the embodiment in FIG. 4, FIG. 6 shows equations eq3 to eq5 according to different embodiments of the present invention. In Step 108, equations eq3 to eq5 may respectively replace equation eq2 to calculate the correlation index MR(t). As shown by equations eq2 to eq5, the correlation index MR(t) may be calculated by adopting different normalized factors as the denominator in the present invention.

Figure 7:
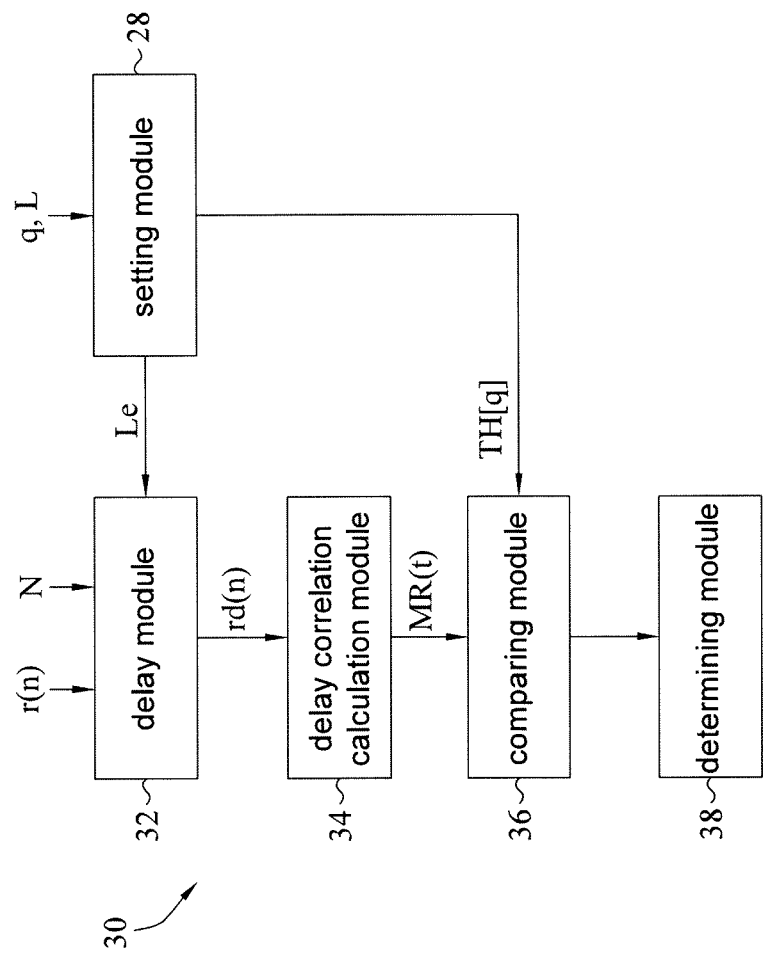
FIG. 7 is a schematic diagram of an apparatus according to an embodiment of the present invention.

FIG. 7 shows an apparatus 30 according to an embodiment of the present invention. The apparatus 30 may be integrated with a receiver of a wireless network (e.g., integrated with a baseband signal processing circuit in a receiver) to implement the process 100 in FIG. 4 for determining a number of transmitting antennas of a transmitter according to a network signal r(n) received at a receiver. The apparatus 30 comprises a setting module 28, a delay module 32, a delay correlation calculation module 34, a comparing module 36 and a determining module 38. The delay module 32, the delay correlation calculation module 34, the comparing module 36 and the determining module 38 are serially coupled to one another. The setting module 28 is coupled to the delay module 32 and the comparing module 36.

In the apparatus 30, the setting module 28 sets the number Le of the estimated shift interval and the threshold TH[q] according to the estimated number q and the number L of the basic delay. The delay module 32 delays the network signal r(n) according to the sum of the number N of the reference period and the number Le to provide the delayed signal rd(n), as in Step 106. The delay correlation calculation module 34 calculates the correlation between the delayed signal rd(n) and the network signal r(n) to generate the correlation index MR(t), as in Step 108. The comparing module 36 compares the correlation index MR(t) and the threshold TH[q], as in Step 110. The determining module 38 determines an unknown quantity of transmitting antennas according to a comparison result of the comparing module 36, as in Steps 112 and 114. The setting module 28 further updates the estimated number q, and sets the number Le of the estimated shift interval and the threshold TH[q] according to the updated estimated number q, as in Steps 118 to 104.

The modules in the apparatus 30 may be realized by software, hardware and/or firmware. For example, the delay module 32, the delay correlation calculation module 34 and the comparing module 36 may be realized by hardware logic circuits.

In conclusion, the present invention is capable of correctly and quickly determining the unknown quantity of transmitting antennas when initially receiving a network signal to effectively enhance signal processing performance of received signals at a receiver. The present invention is applicable to OFDM wireless networks and other types of wireless networks.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method applied to a receiver of a wireless network for determining a unknown quantity of antennas of a transmitter, the receiver receiving a network signal synthesized from a plurality of single-antenna signals corresponding to the unknown quantity of antennas, each of the single-antenna signals being transmitted from a corresponding antenna among the antennas and comprising a plurality of reference messages, each of the reference messages lasting for a reference period; the method comprising:
   delaying the network signal according to a sum of the reference period and an estimated shift interval to provide a delayed signal;
   calculating a correlation between the delayed signal and the network signal to generate a correlation index;
   comparing the correlation index with a threshold to provide a comparison result; and
   determining the unknown quantity according to the comparison result.

2. The method according to claim 1, a cyclic shift delay between the reference messages of the different single-antenna signals being an integral multiple of a basic delay; the determining step further comprising:
   determining the unknown quantity according to a ratio of the estimated shift interval and the basic delay.

3. The method according to claim 1, a cyclic shift delay between the reference messages of the different single-antenna signals being an integral multiple of a basic delay; the method further comprising:
   setting the estimated shift interval according to the basic delay and an estimated number.

4. The method according to claim 3, wherein the determining step further comprises:
   determining that the unknown quantity is no less than the estimated number when the comparison result indicates that the correlation index is greater than the threshold.

5. The method according to claim 3, wherein the determining step further comprises:
   determining that the unknown quantity is less than the estimated number when the comparison result indicates that the correlation index is smaller than the threshold.

6. The method according to claim 3, further comprising:
   updating the estimated number, and iterating the steps of setting, delaying, calculating, comparing and determining.

7. The method according to claim 6, further comprising:
   updating the threshold when updating the estimated number.

8. The method according to claim 7, wherein updating the threshold comprises decreasing the threshold when increasing the estimated number.

9. The method according to claim 1, wherein the step of calculating the correlation further comprises:
   providing a normalized factor according to the network signal; and
   accumulating a product of the delayed signal and the network signal to provide an accumulation result, and generating the correlation index according to a ratio of the accumulation result and the normalized factor.

10. The method according to claim 1, wherein the step of calculating the correlation accumulates a product of the delayed signal and the network signal in an accumulation period to provide an accumulation result, and generates the correlation index according to the accumulation result, and length of the accumulation period equals length of the reference period.

11. An apparatus applied to a receiver of a wireless network for determining an unknown quantity of antennas of a transmitter, the receiver receiving a network signal synthesized from a plurality of single-antenna signals corresponding to the unknown quantity of antennas, each of the single-antenna signals being transmitted from a corresponding antenna among the antennas and comprising a plurality of reference messages, each of the reference messages lasting for a reference period; the apparatus comprising:
   a delay module, for delaying the network signal according to the reference period and an estimated shift interval to provide a delayed signal;
   a delay correlation calculation module, for calculating a correlation between the delayed signal and the network signal to generate a correlation index;
   a comparing module, for comparing the correlation index with a threshold to provide a comparison result; and
   a determining module, for determining the unknown quantity according to the comparison result.

12. The apparatus according to claim 11, a cyclic shift delay between the reference messages of the different single-antenna signals is being an integral multiple of a basic delay; the determining module further determining the unknown quantity according to a ratio of the estimated shift interval and the basic delay when determining the unknown quantity according to the comparison result.

13. The apparatus according to claim 11, a cyclic shift delay between the reference messages of the different single-antenna signals being an integral multiple of a basic delay; the apparatus further comprising:
   a setting module, for setting the estimated shift interval according to the basic delay and an estimated number.

14. The apparatus according to claim 13, wherein the determining module determines that the unknown quantity is no less than the estimated number when the comparison result indicates that the correlation index is greater than the threshold.

15. The apparatus according to claim 13, wherein the determining module determines that the unknown quantity is less than the estimated number when the comparison result indicates that the correlation index is smaller than the threshold.

16. The apparatus according to claim 13, wherein the setting module further updates the estimated number and resets the estimated shift interval according to the basic delay and the updated estimated number, and prompts the delay module, the delay correlation calculation module, the comparing module and the determining module to sequentially repeat corresponding operations.

17. The apparatus according to claim 16, wherein the setting module also updates the threshold when updating the estimated number.

18. The apparatus according to claim 17, wherein the setting module decreases the threshold when increasing the estimated number.

19. The apparatus according to claim 11, wherein the delay correlation calculation module further:
   provides a normalized factor according to the network signal; and
   accumulates a product of the delayed signal and the network signal to provide an accumulation result, and generates the correlation index according to a ratio of the accumulation result and the normalized factor.

20. The apparatus according to claim 11, wherein the delay correlation calculation module accumulates a product of the delayed signal and the network signal in an accumulation period to provide an accumulation result, and generates the correlation index according to the accumulation result, and length of the accumulation period equals length of the reference period.

\* \* \* \* \*